United States Patent [19]
Weathington, Sr.

[11] Patent Number: 5,452,544
[45] Date of Patent: Sep. 26, 1995

[54] TAMPER RESISTANT GATE LATCHING MECHANISM

[76] Inventor: Roy E. Weathington, Sr, 988 Alexandria-Wellington Rd., Alexandria, Ala. 36250

[21] Appl. No.: 69,428

[22] Filed: Jun. 1, 1993

[51] Int. Cl.⁶ ................................................. E05B 65/06
[52] U.S. Cl. .............................. 49/394; 49/449; 292/128; 292/228
[58] Field of Search ............................ 292/DIG. 46, 128, 292/121, 108, 228, 219, 210; 49/394, 449

[56] References Cited

U.S. PATENT DOCUMENTS

| | | | |
|---|---|---|---|
| 481,910 | 8/1892 | Monroe | 292/228 X |
| 917,969 | 4/1909 | Shinn | 292/DIG. 46 X |
| 1,060,546 | 4/1913 | Green | 292/228 |
| 2,326,069 | 8/1943 | Samzelius | 292/128 |
| 2,378,654 | 6/1945 | Pekny | 292/124 X |
| 2,468,353 | 4/1949 | Weinke | 292/228 |
| 2,638,370 | 5/1953 | Price | 292/128 X |
| 2,644,708 | 7/1953 | Poole | 292/210 X |
| 4,451,072 | 5/1984 | Petty | 292/128 |
| 4,690,440 | 9/1987 | Rogers | 292/228 X |

FOREIGN PATENT DOCUMENTS 368454  3/1932  United Kingdom .................... 292/210

Primary Examiner—Peter M. Cuomo
Assistant Examiner—Jerry Redman
Attorney, Agent, or Firm—Veal & Marsh

[57] ABSTRACT

A tamper resistant gate latching mechanism utilizes a pivotal latch bar extending from a tamper resistant housing mounted to a free end of a movable gate and a cooperative catch member mounted to a gate post for engagement with said latch bar such that alignment of the latch bar with the catch member obscures the fasteners latching catch member to the gate post thereby shielding the fastener from tampering.

13 Claims, 6 Drawing Sheets

FIG. 7
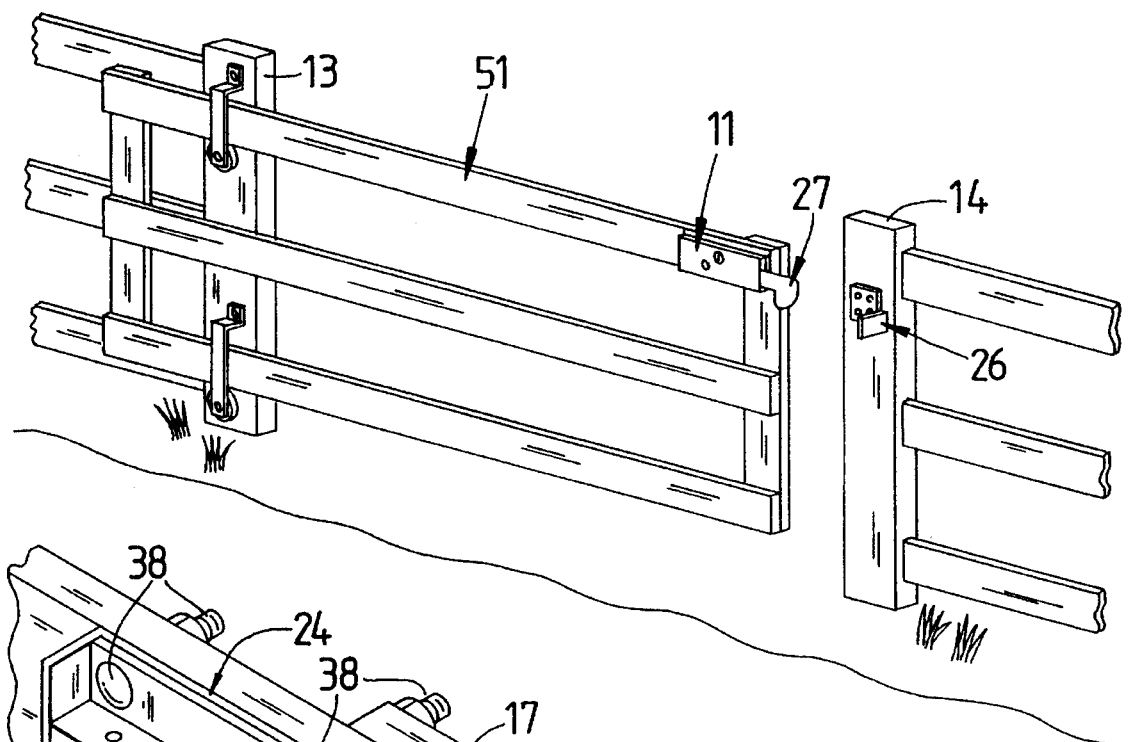
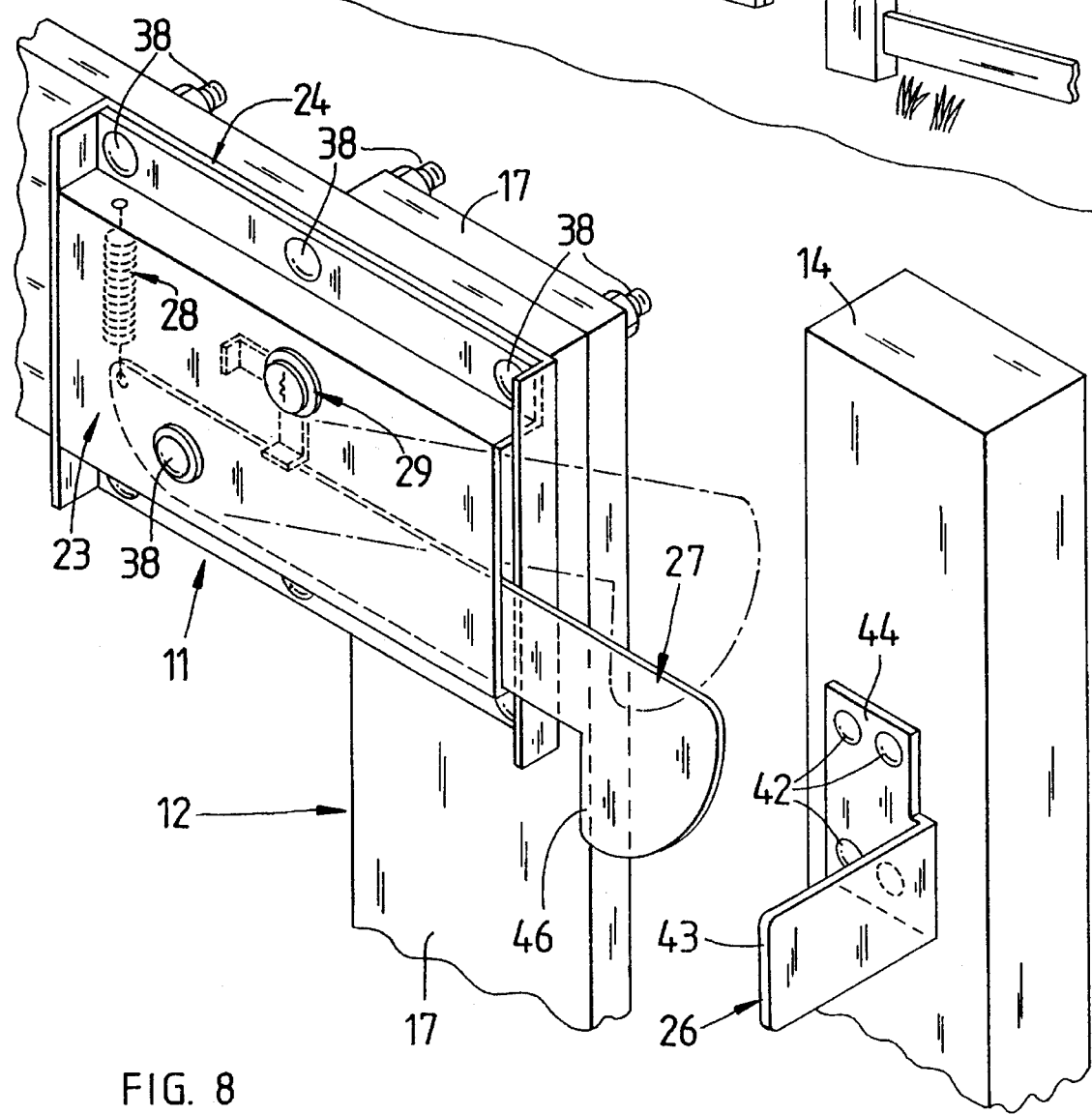
FIG. 8

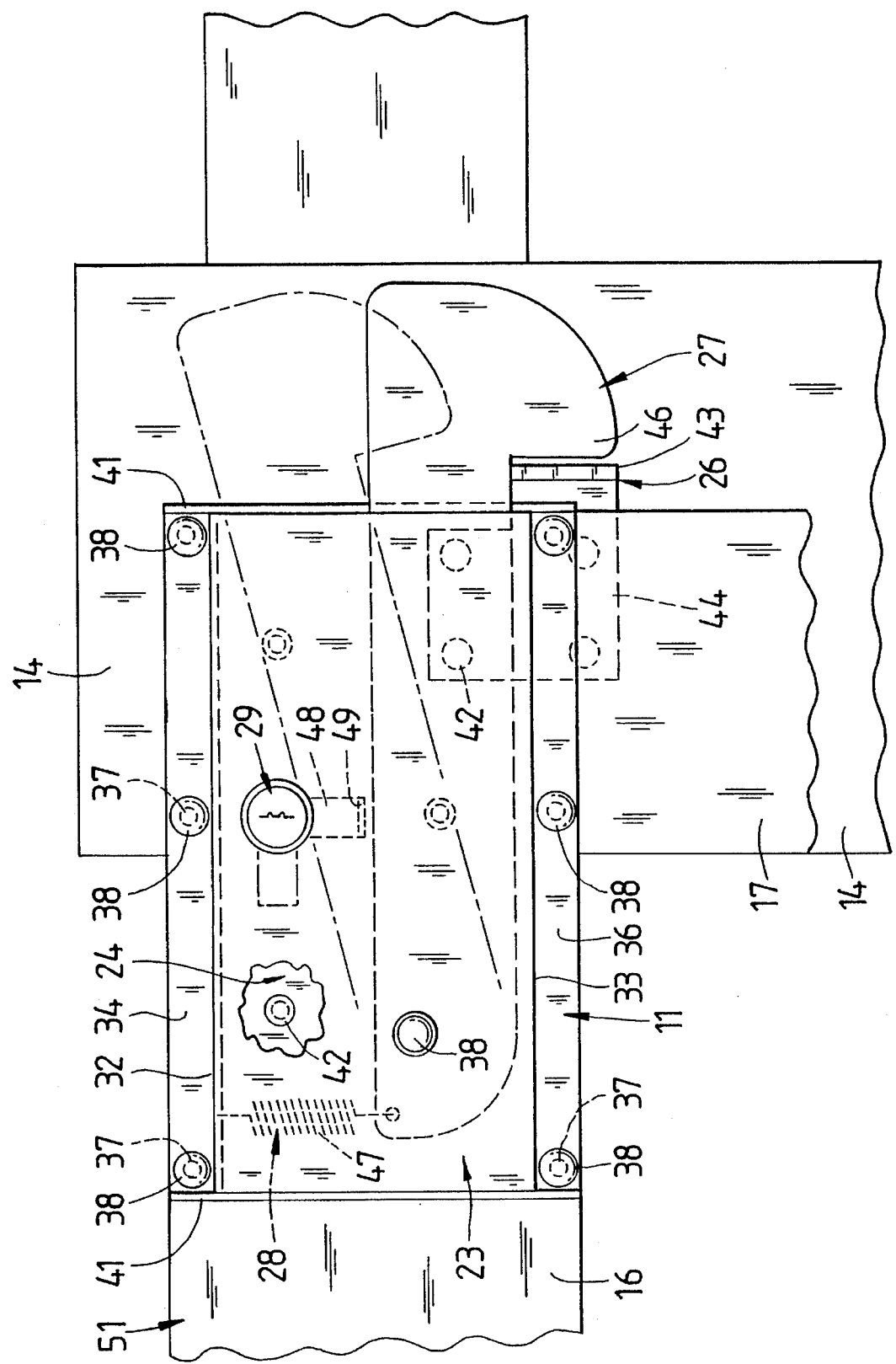

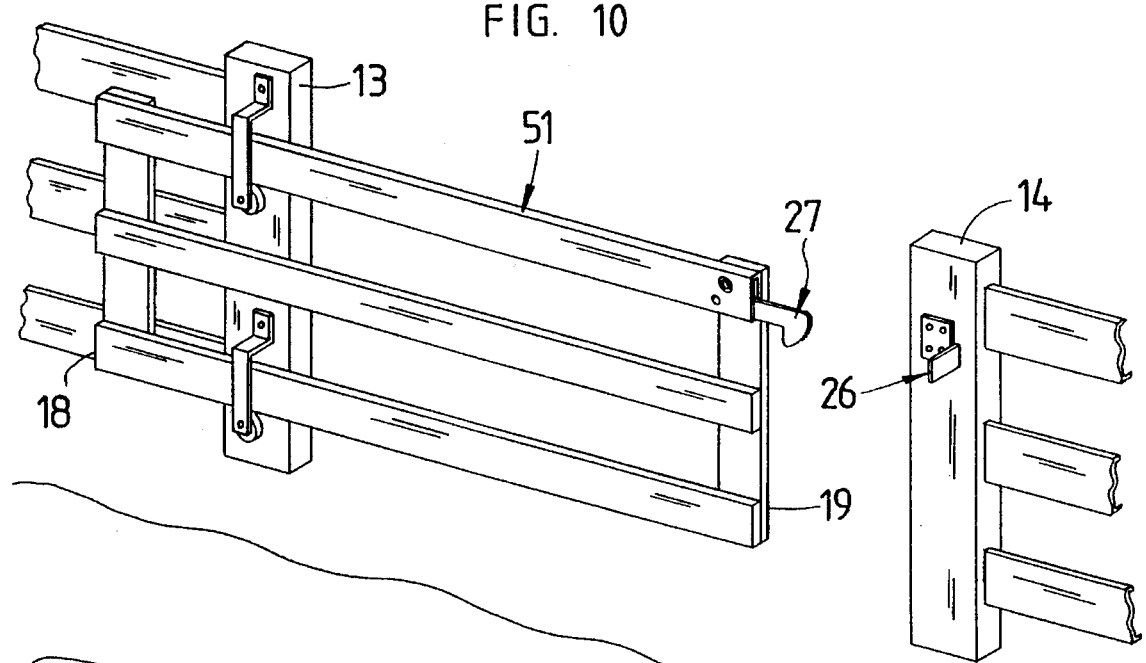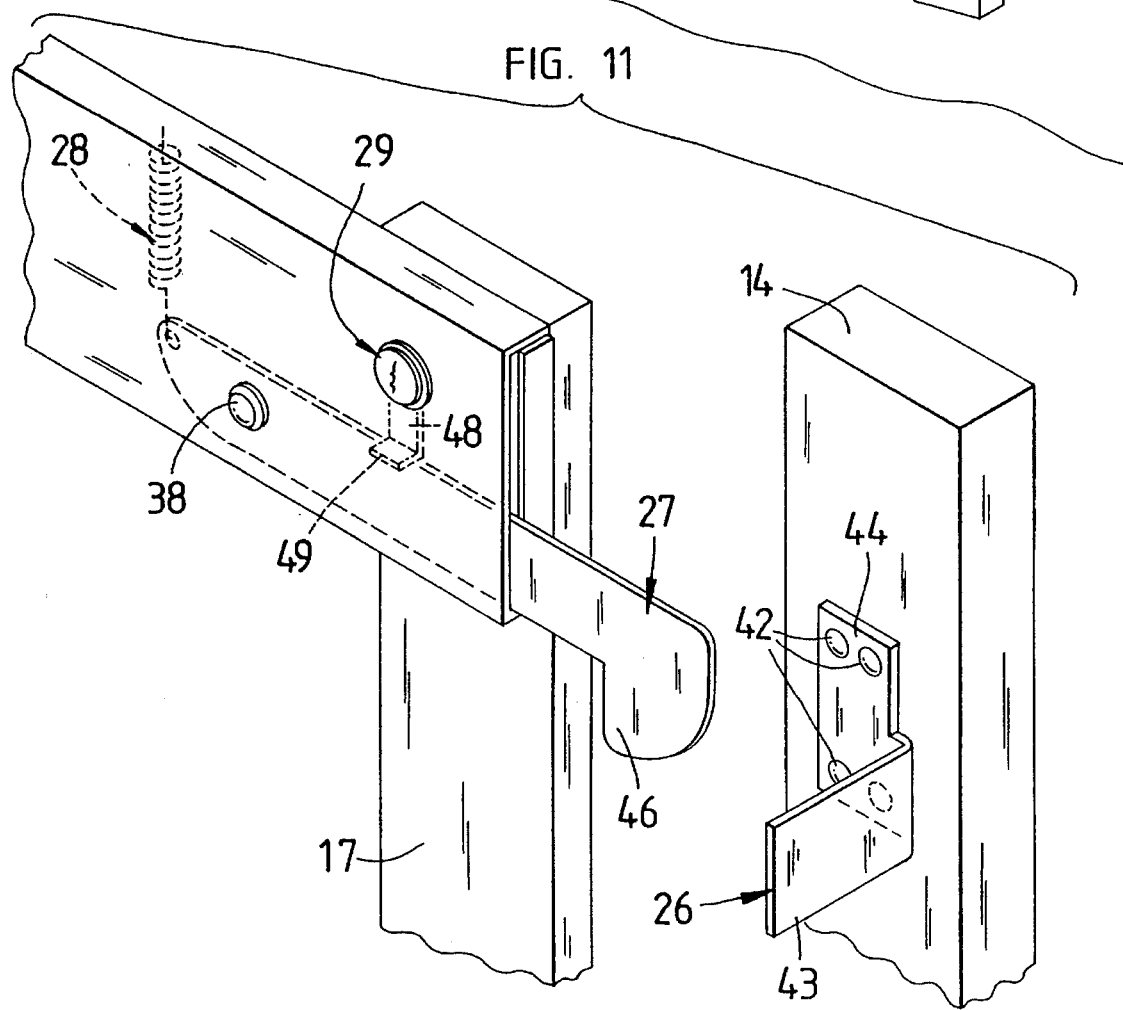

TAMPER RESISTANT GATE LATCHING MECHANISM

FIELD OF THE INVENTION

The present invention relates to movable gates and more particularly to gate latches. In even greater particularity, the present invention relates to a tamper resistant gate latching mechanism either integral with or mounted to a movable gate by tamper resistant fasteners for securing the gate to a stationary fence such that access to and removal of the fasteners is substantially restricted when the gate is locked in close proximity to the stationary fence.

BACKGROUND OF THE INVENTION

Various types of gate latches are known in the art. Many utilize conventional padlocks or the like to secure the gate latch. However, almost all existing gate latches are subject to at least two major drawbacks.

First, conventional padlocks are easily defeated in a very short amount of time merely by using ordinary lock cutters. Second, existing gate latches are easily disassembled using ordinary tools thus defeating the purpose of the lock. In such instance, the lock is bypassed altogether by disassembling the gate latch itself. Moreover, if the gate latch is disassembled, it is obvious that it may be reassembled without leaving any indication or evidence that it has been tampered with or defeated.

As a result, many property owners discover that property has been stolen from their land by a person(s) who has simply disassembled and reassembled the gate latch which has been secured or locked in the conventional manner described above. This is particularly relevant in the case of a rancher or farmer owning many heads of cattle or expensive equipment. Considerable time may lapse before the rancher or farmer discovers property missing based on the fact that the gate latch was disassembled and reassembled with ordinary tools, thus leaving no evidence of theft.

While the above mentioned devices are suited for their intended purpose, none of the devices disclose a tamper resistant gate latching mechanism that will indicate when the latch has been altered or defeated. Additionally, none of the devices include tamper resistant fasteners which are located on the latch in such a manner as to substantially prevent access thereto. Inasmuch as the art is relatively crowded with respect to these various types of conventional latches and locks, it can be appreciated that there is a continuing need for and interest in improvements to such latches, and in this respect, the present invention addresses this need and interest.

SUMMARY OF THE INVENTION

In view of the foregoing disadvantages inherent in the known types of latches now present in the art, the present invention provides an improved tamper resistant gate latching mechanism. As such, the principal object of the present invention is to provide a new and improved lockable gate latching mechanism that is tamper resistant yet will indicate when it has been defeated or altered.

In support of the principal object, another object of the present invention is to provide a new and improved gate latching mechanism that has all the advantages of the prior art latches and none of the disadvantages.

It is another object of the present invention is to provide a new and improved gate latching mechanism which may be easily and efficiently manufactured and marketed.

It is a further object of the present invention to provide a new and improved gate latching mechanism which is of durable and reliable construction.

Even still another object of the present invention is to provide a new and improved gate latching mechanism that utilizes tamper resistant fasteners such as carriage bolts or blind rivets such that access to and removal of the fasteners is substantially obstructed when the gate is locked in close proximity to a stationary fence.

Yet another object of the present invention is to provide a new and improved gate latch having the aforesaid characteristics that is visually attractive and occupies a minimal amount of space.

An even further object of the present invention is to provide a new and improved gate latching mechanism which is susceptible of a low cost of manufacture with regard to both materials and labor, and which accordingly is then susceptible of low prices of sale to the consuming public, thereby making such latches economically available to the buying public.

These together with other objects of the present invention, along with the various features of novelty which characterize the invention, are accomplished through the use of a cover plate mounted to a movable gate by at least two tamper resistant fasteners such as carriage bolts, blind rivets, etc. The cover plate is mounted to the gate such that access to and removal of the tamper resistant fasteners is substantially restricted when the gate is locked in close proximity to the fence.

A mounting plate, having vertically disposed end portions, is connected to the gate intermediate the gate and cover plate by standard fasteners. Therefore, access to and removal of the mounting plate fasteners is prevented by the cover plate and end portions.

In addition, a catch member is mounted to the fence intermediate the fence and gate by standard fasteners. Again, access to and removal of the catch member fasteners is substantially obstructed when the gate is locked in close proximity to the fence. Moreover, a latch bar is pivotally connected to the cover plate for locking engagement with the catch member.

A spring is connected to the cover plate at one end and to the latch bar at the other. The spring continuously urges the latch bar into locking engagement with the catch member. Further, a manually operated key-responsive "L" shaped member is connected to the cover plate and is rotatably and selectively urged into and out of locking abutment with the latch bar for securing the latching mechanism.

The present invention may be utilized with both pivotally and slidably mounted gates and is usually attached to the movable gate. However, the present invention may also be an integral part of the gate itself with all of it components housed internally of the gate. Furthermore, it is to be understood that the orientation of these components may be reversed without departing from the scope of the invention. That is, the major components may also be mounted to the stationary fence as opposed to the movable gate. Numerous other features of the novel construction will become apparent from a study of the drawings and the description of the preferred embodiment.

BRIEF DESCRIPTION OF THE DRAWINGS

Apparatus embodying features of the present invention are depicted in the accompanying drawings which form a portion of this disclosure and wherein:

FIG. 7 is a perspective view showing an alternate embodiment of the present invention attached to a sliding gate and stationary fence;

FIG. 8 is an enlarged perspective view showing the alternate embodiment of the present invention attached to a sliding gate and stationary fence;

FIG. 9 is a front elevational view showing the alternate embodiment of the present invention attached to a sliding gate and stationary fence;

FIG. 10 is a perspective view showing the alternate embodiment of the present invention attached to a sliding gate and stationary fence; and FIG. 11 is an enlarged perspective view showing the alternate embodiment of the present invention integrally attached to a sliding gate and stationary fence.

DESCRIPTION OF A PREFERRED EMBODIMENT

Figure 1:
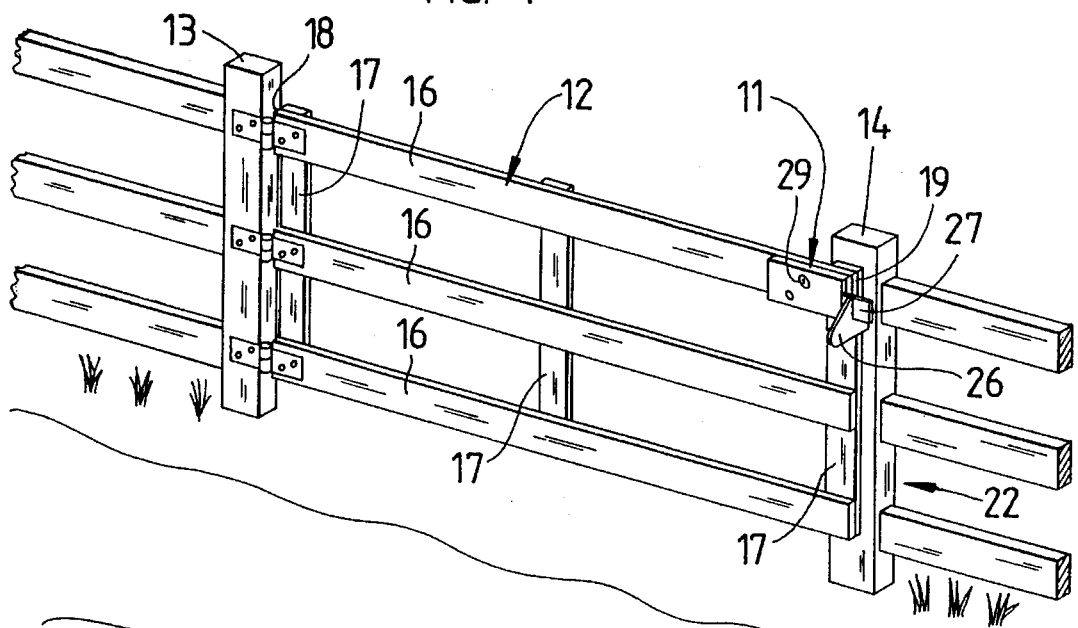
FIG. 1 is a perspective view showing the present invention attached to a pivotally mounted gate and stationary fence.
Figure 4:
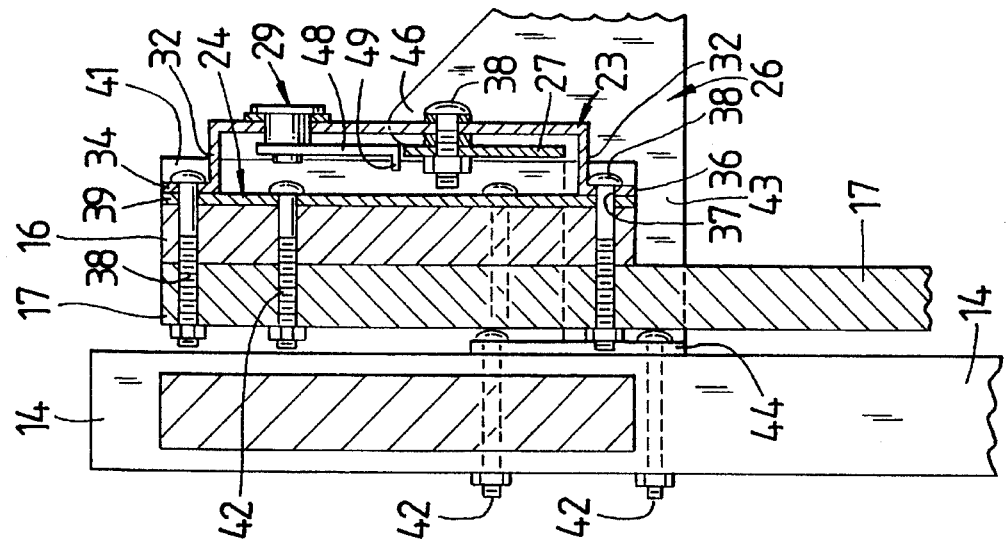
FIG. 4 is a sectional view of the present invention taken along line 4—4 of FIG. 3.

Referring to the drawings for a clearer understanding of the present invention, it should be noted in FIG. 1–6 that the first embodiment of the improved tamper resistant gate latching mechanism, which is the subject of this application, is generally designated by the reference numeral 11 and contemplates use with a movable gate 12 pivotally mounted to a stationary fence post 13 and a stationary latch post 14. The movable gate 12 has a plurality of horizontally disposed frame members 16 and at least two vertical frame members 17 defining first 18 and second 19 end portions of gate 12. Specifically, gate 12 is pivotally mounted at its first end portion 18 to the stationary fence post 13 for selectively moving it to an open 21 and closed 22 position wherein the second end portion 19 of gate 12 is in close proximity to the stationary latch post 14 when gate 12 is in closed position 22. This is best illustrated in FIGS. 1 and 4.

Figure 2:
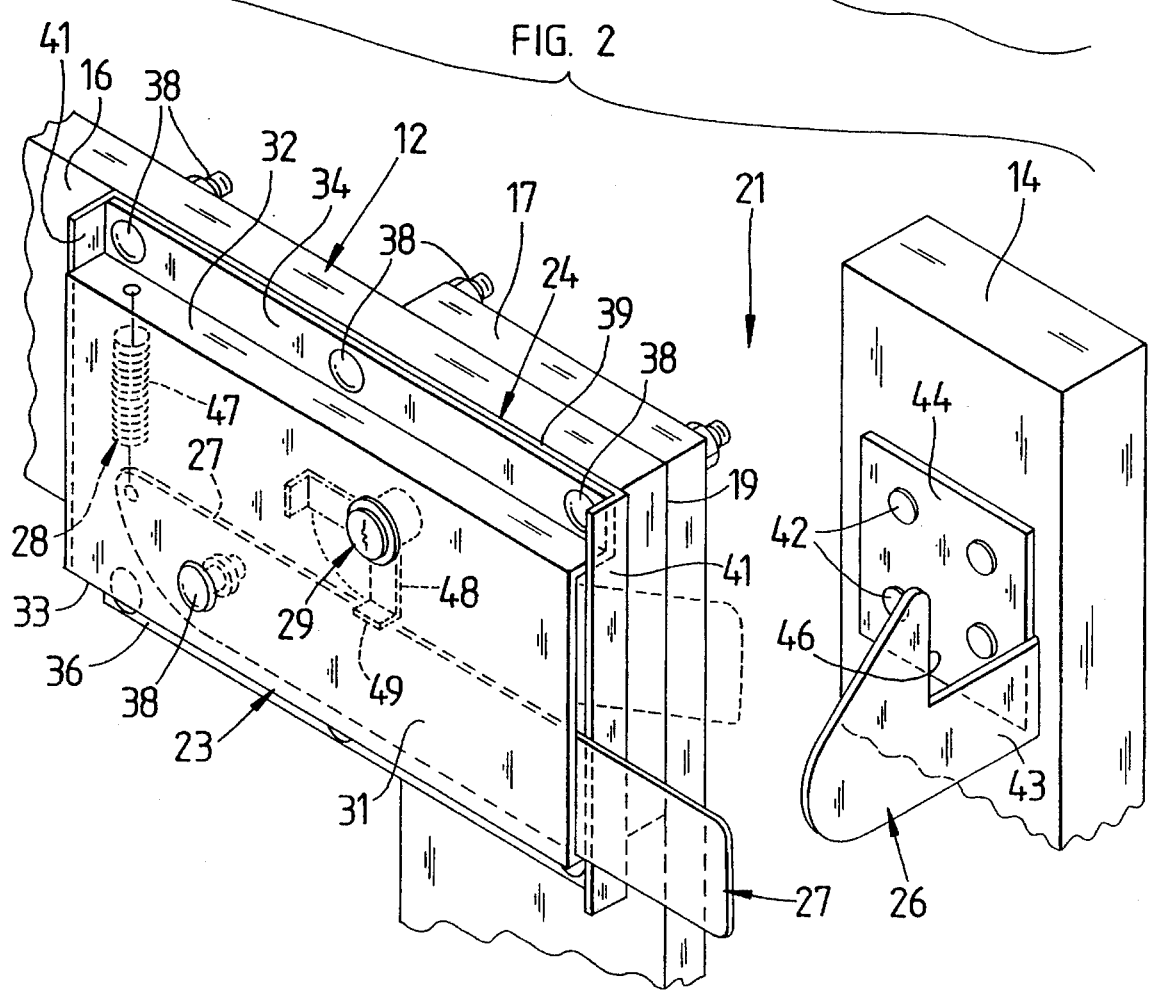
FIG. 2 is an enlarged perspective view showing the present invention attached to a pivotally mounted gate and stationary fence.
Figure 3:
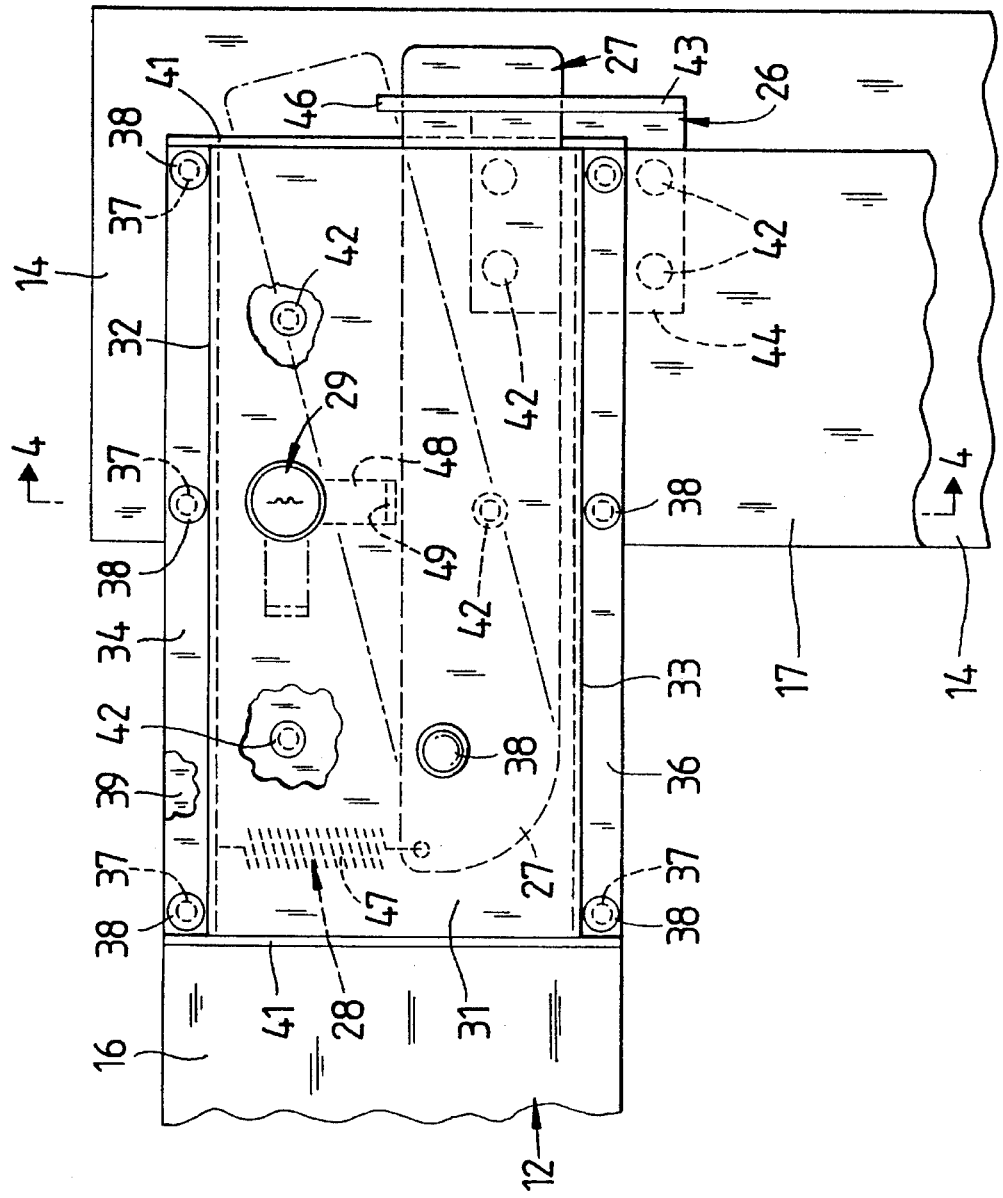
FIG. 3 is a front elevational view showing the present invention attached to a pivotally mounted gate and stationary fence.

As shown in FIGS. 2–4, the first embodiment of the improved gate latching mechanism 11 is comprised of a cover plate 23, mounting plate 24, catch member 26, latch bar 27, means 28 for urging latch bar 27 into locking engagement with catch member 26, and means 29 for securing latch bar 27 into locking engagement with catch member 26.

The primary purposes of cover plate 23 is to provide a housing and tamper resistant environment for the latch bar 27, means 28 for urging the latch bar 27 into locking engagement with the catch member 26, and means 29 for securing the latch bar 27 into locking engagement with catch member 26. It is typically manufactured out of some type of known metal or composite into a generally rectangular plate 31 having transverse horizontally disposed top 32 and bottom 33 portions. Moreover, cover plate 23 includes first 34 and second 36 flange portions which are integrally connected to the top 32 and bottom 33 portions, respectively. Each defines at least one aperture 37 therethrough for operatively receiving a tamper resistant fastener 38 such as a carriage bolt for attachment to gate 12 or a blind rivet (not shown) for mounting directly to mounting plate 24. Most importantly, as shown in FIG. 4, cover plate 23 is mounted to gate 12 such that access to and/or removal of tamper resistant fasteners 38 is substantially hindered when gate 12 is locked in closed position 22 which is in close proximity to stationary latch post 14.

As shown in FIGS. 2–4, mounting plate 24 is typically manufactured out of the same type of material as cover plate 23 into a generally rectangular plate 39 having vertically disposed perpendicular end portions 41. It is connected to gate 12, intermediate gate 12 and cover plate 23 by standard fasteners 42. Once cover plate 23 is mounted as described above, it and end portions 29 of mounting plate 24 prevent access to and removal of standard fasteners 42.

As noted above, an alternative method for mounting cover plate 23 to gate 12 consists of first attaching mounting plate 24 to gate 12 (as described immediately above) by standard fasteners 42, then attaching cover plate 23 to mounting plate 24 by blind rivets (not shown).

In FIGS. 1–6, catch member 26 defines a normal portion 43 relative the stationary latch post 14 and a mounting portion 44 extending between the stationary latch post 14 and the second end portion 19 of gate 12 when gate 12 is in closed position 22. Mounting portion 44 is attached to stationary latch post 14 by standard fasteners 42 such that access to and removal of it and fasteners 42 are substantially impaired when gate 12 is locked in closed position 22 which is in close proximity to stationary latch post 14.

Moreover, in the first embodiment of the gate latching mechanism 11, catch member 26 defines a hook portion 46 for lockingly engaging latch bar 27. Latch bar 27 is pivotally mounted to an internal surface of cover plate 23 by a tamper resistant fastener 38 which is cammingly guided by hook portion 46 of catch member 26 until is reaches full locked engagement as shown in FIGS. 1, 3 and 5.

While latch bar 27 is being cammingly guided by hook portion 46 of catch member 26 to closed position 22, urging means 28 is continuously urging latch bar 27 into locking engagement with catch member 26. Urging means 28 is comprised of a spring 47 or similar elastic means connected to the top portion 32 of cover plate 23 and to latch bar 27 proximate the pivot connection point of latch bar 27. It is to be noted that the present invention may successfully operate without urging means 28 based on the fact that the present invention includes securing means 29.

As shown in FIGS. 2–4 and 6, the present invention requires securing means 29 for locking the gate latching mechanism 11. Securing means 29 is comprised of a key-responsive "L" shaped member 48 which is rotatably urged into and out of locking abutment with latch bar 27. It is attached to the cover plate 23 proximate latch bar 27. When in locked position, "L" shaped member 48 extends vertically downward with its perpendicular portion 49 abutting latch bar 27 preventing further pivotal movement. Rotational movement of "L" shaped member 48 is only manually obtained through the use of a key (not shown).

Figure 5:
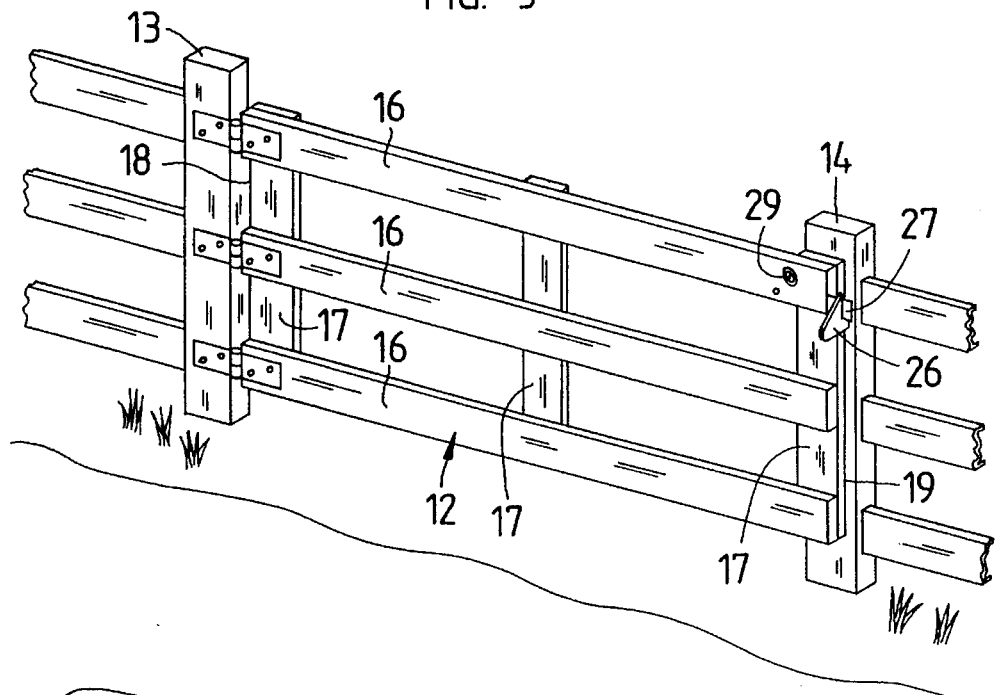
FIG. 5 is a perspective view showing the present invention integrally connected to a pivotally mounted gate and stationary fence.
Figure 6:
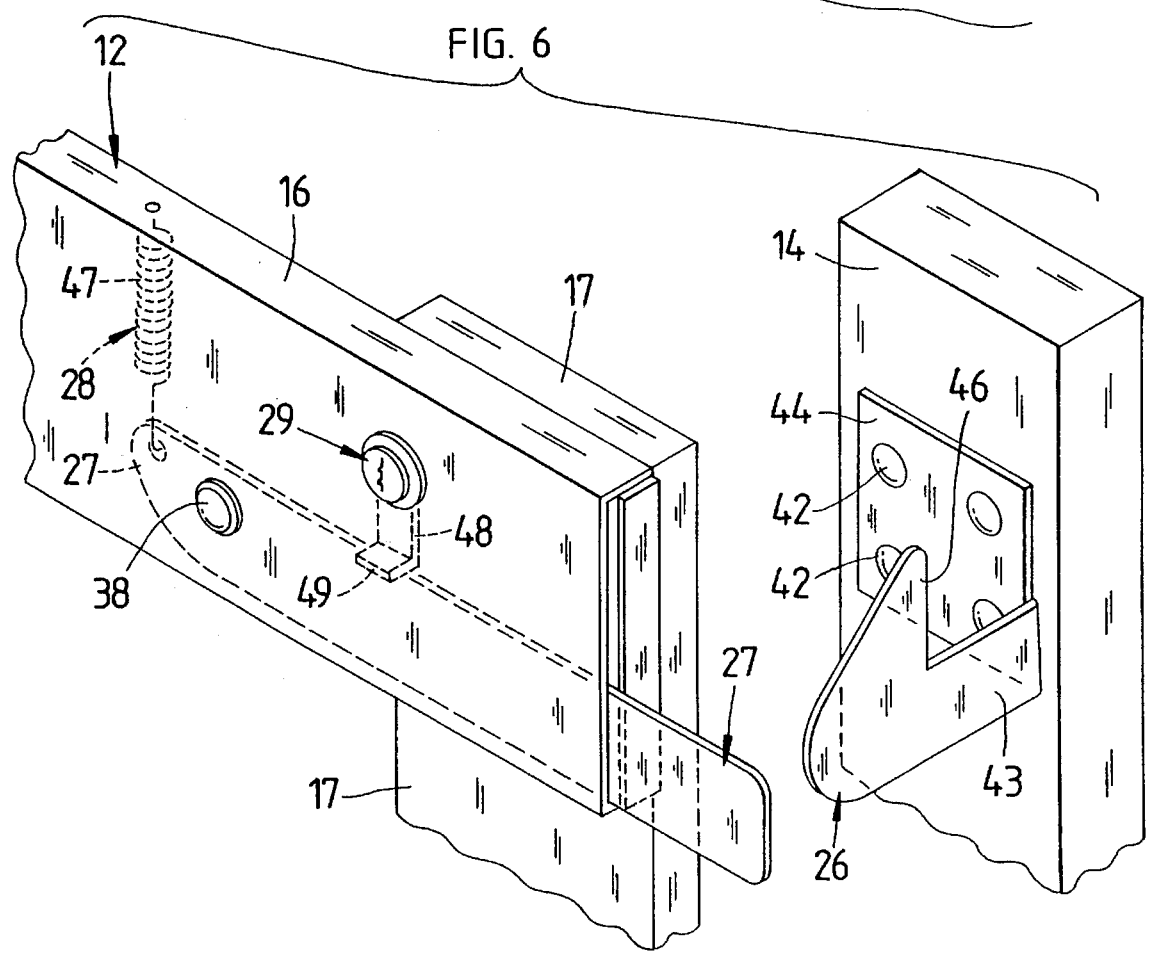
FIG. 6 is an enlarged perspective view showing the present invention integrally connected to a pivotally mounted gate and stationary fence.

In FIGS. 5 and 6, it is noted that the first embodiment of the present invention may be integrally fabricated as an internal part of gate 12 itself including all of the novel characteristics.

As shown in FIGS. 7–11, a second embodiment of the improved tamper resistant gate latching mechanism 11 contemplates use with a stationary fence post 13 and a slidably mounted gate 51. The second embodiment is the same as the first except that latch bar 27, instead of catch member 26, defines a hook portion 46. In both embodiments, the fasteners are inaccessible due to the fact that gate 12 is locked in closed position 22 which is in close proximity to stationary latch post 14.

From the foregoing, it should be clear that the present invention represents a substantial improvement over the prior art.

While I have shown my invention in several forms, it will be obvious to those skilled in the art that it is not so limited but is susceptible of various changes and modifications without departing from the spirit thereof.

What is claimed is:

1. In a gate having a plurality of horizontally disposed frame members and at least two vertical frame members defining first and second ends of said gate, said gate movably mounted at said first end to a stationary fence post for selectively moving said gate to an open and closed position wherein said second end is in close proximity to a stationary latch post when said gate is in said closed position, the improvement in said gate comprising in combination therewith of:

(a) a catch member having a normal portion relative said latch post and a mounting portion for attachment to said latch post, said mounting portion extending between said latch post and said second end of said gate when said gate is in said closed position;

(b) a lockable latch bar pivotally mounted to said second end of said gate for operatively engaging said normal portion of said catch member so said gate moves to said closed position wherein said mounting portion of said catch member is inaccessible when said gate is in said closed position with said latch bar in locked engagement with said normal portion; and (c) a key-responsive "L" shaped member that is rotatably urged into and out of locking abutment with said latch bar for securing said latch bar into locking engagement with said normal portion of said catch member.

2. An improved gate as defined in claim 1 wherein said gate is pivotally mounted at said first end to said stationary fence post for selectively swinging said gate to said open and closed position.

3. An improved gate as defined in claim 2 wherein said normal portion of said catch member defines a hook portion for camming engagement with said latch bar.

4. An improved gate as defined in claim 2 wherein said gate further comprises means for continuously urging said latch bar into operative engagement with said catch member.

5. An improved gate as defined in claim 4 wherein said continuous urging means comprises a spring operatively connected to said gate and said latch bar.

6. An improved tamper resistant gate latching mechanism used in combination with a gate having a plurality of horizontally disposed frame members and at least two vertical frame members defining first and second ends of said gate, said gate operatively mounted at said first end to a stationary fence post for selectively moving said gate to an open and closed position wherein said second end of said gate is in close proximity to a stationary latch post when said gate is in said closed position, said gate latching mechanism comprising:

(a) a cover plate, having transverse horizontally disposed top and bottom portions, mounted to one of said horizontally disposed frame members of said gate by at least two tamper resistant fasteners, said top and bottom portions having first and second flange portions integrally connected thereto wherein each said flange portion defines at least one aperture therethrough for operative engagement with one of said tamper resistant fasteners, said cover plate connected to said gate such that access to and removal of said tamper resistant fasteners is substantially obstructed when said gate is locked in said closed position proximate said stationary latch post;

(b) a mounting plate, having vertically disposed perpendicular end portions, connected to said second end of said gate intermediate said gate and said cover plate by at least two mounting plate fasteners wherein said cover plate and said end portions substantially prevent access to and removal of said mounting plate fasteners;

(c) a catch member having a normal portion relative said latch post and a mounting portion for attachment to said latch post, said mounting portion extending between said latch post and said second end of said gate when said gate is in said closed position and mounted to said stationary latch post by at least two catch member fasteners such that access to and removal of said fasteners is substantially obstructed when said gate is in said closed position proximate said latch post;

(d) a latch bar pivotally connected to said cover plate for locking engagement with said normal portion of said catch member;

(e) means for continuously urging said latch bar into locking engagement with said normal portion of said catch member; and (f) means connected to said cover plate for securing said latch bar into locking engagement with said normal portion of said catch member comprising a key-responsive "L" shaped member that is rotatably urged into and out of locking abutment with said latch bar.

7. An improved tamper resistant gate latching mechanism as, defined in claim 6 wherein said gate is pivotally mounted at said first end to said stationary fence post for selectively swinging said gate to said open and closed position.

8. An improved tamper resistant gate latching mechanism as defined in claim 6 wherein said normal portion of said catch member defines a hook portion for locking engagement with said latch bar.

9. An improved tamper resistant gate latching mechanism as defined in claim 6 wherein said gate is slidably mounted to said stationary fence post for selectively sliding said gate to said open and closed position.

10. An improved tamper resistant gate latching mechanism used in combination with a gate having a plurality of horizontally disposed frame members and at least two vertical frame members defining first and second ends of said gate, said gate operatively mounted at said first end to a stationary fence post for selectively moving said gate to an open and closed position wherein said second end of said gate is in close proximity to a stationary latch post when said gate is in said closed position, said gate latching mechanism comprising:

(a) a housing, having transverse horizontally disposed top and bottom flange portions, mounted to one of said horizontally disposed frame members of said gate by tamper resistant fasteners, said top and bottom flange portions each defining at least one aperture therethrough for operatively receiving one of said tamper resistant fasteners, said housing mounted to said gate such that access to and removal of said fasteners is substantially restricted when said gate is locked in said closed position proximate said stationary latch post;

(b) a catch member having a normal portion relative said latch post and a mounting portion for attachment to said latch post, said mounting portion extending between said latch post and said second end of said gate when said gate is in said closed position and mounted to said stationary latch post by catch member fasteners such that access to and removal of said fasteners is substantially restricted when said gate is locked in said closed position proximate said latch post;

(c) a latch bar pivotally mounted to an internal surface of said housing for operative locking engagement with said normal portion of said catch member; and (d) a securing means comprising a spring connected to an internal surface of said housing and to said latch bar and a key-responsive "L" shaped member that is rotatably urged into and out of locking abutment with said latch bar for securing said latch bar into locking engagement with said normal portion of said catch member.

11. An improved tamper resistant gate latching mechanism, comprising:

(a) a latch housing having a latch bar operatively connected thereto a spring connected to an internal surface of said latch housing and to said latch bar, a key-responsive "L" shaped member that is rotatably urged into and out of locking abutment with said latch bar and tamper resistant fasteners for mounting said latch housing to a movable gate such that access to and removal of said fasteners is substantially impaired when said gate is locked in close proximity to a fence; and (b) a catch member mounted to said fence by mounting fasteners for lockingly engaging said latch bar such that access to and removal of said mounting fasteners is substantially impaired when said gate is locked in said close proximity to said fence.

12. An improved tamper resistant gate latching mechanism as defined in claim 11 wherein said latch housing further comprises means connected thereto for securing said latch bar into locking engagement with said catch member.

13. An improved tamper resistant gate latching mechanism as defined in claim 11 wherein said catch member defines a hook portion for locking engagement with said latch bar.

\* \* \* \* \*